(12) United States Patent
Edwards et al.

(10) Patent No.: US 8,185,430 B2
(45) Date of Patent: May 22, 2012

(54) SUPPLIER STRATIFICATION

(75) Inventors: Mary Frances Edwards, Charlotte, NC (US); Gary Francis Page, Concord, NC (US); Kevin Michael Woerner, Charlotte, NC (US); Michael Shayne White, Fort Mill, SC (US); Rosanna Lea Hamilton, Charlotte, NC (US); Lee Otto Bernard Martinec, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 503 days.

(21) Appl. No.: 12/363,145

(22) Filed: Jan. 30, 2009

(65) Prior Publication Data

US 2010/0198631 A1 Aug. 5, 2010

(51) Int. Cl.
*G06Q 10/00* (2012.01)
*G06Q 40/00* (2012.01)
(52) U.S. Cl. ........................................ 705/7.28
(58) Field of Classification Search .............. 705/7.28, 705/1.1
See application file for complete search history.

(56) References Cited

U.S. PATENT DOCUMENTS

| | | | | |
|---|---|---|---|---|
| 7,809,595 | B2* | 10/2010 | Breslin et al. | 705/7.28 |
| 2002/0069096 | A1* | 6/2002 | Lindoerfer et al. | 705/7 |
| 2002/0099586 | A1* | 7/2002 | Bladen et al. | 705/7 |
| 2003/0065241 | A1* | 4/2003 | Hohnloser | 600/1 |
| 2003/0125997 | A1* | 7/2003 | Stoltz | 705/7 |
| 2003/0229525 | A1 | 12/2003 | Callahan et al. | |
| 2004/0059627 | A1 | 3/2004 | Baseman et al. | |
| 2004/0128186 | A1 | 7/2004 | Breslin et al. | |
| 2004/0172353 | A1 | 9/2004 | Charnley, Jr. | |
| 2005/0125324 | A1 | 6/2005 | Eicher | |
| 2007/0016542 | A1* | 1/2007 | Rosauer et al. | 706/21 |
| 2007/0050201 | A1* | 3/2007 | Gardner et al. | 705/1 |
| 2007/0255647 | A1 | 11/2007 | Eicher et al. | |
| 2008/0027841 | A1 | 1/2008 | Eder | |
| 2008/0046303 | A1 | 2/2008 | Gordon et al. | |
| 2008/0052101 | A1* | 2/2008 | Ziade et al. | 705/1 |
| 2009/0018847 | A1 | 1/2009 | Vanbeck et al. | |
| 2009/0070188 | A1* | 3/2009 | Scott et al. | 705/10 |
| 2009/0113427 | A1 | 4/2009 | Brady et al. | |

(Continued)

OTHER PUBLICATIONS

Jennifer V. Blackhurst, "Supplier Risk and Assessment and Monitoring for the Automotive Industry", International Journal of Physical Distribution & Logistics Management, v. 38, n2, pp. 143-165, 2008.*

(Continued)

*Primary Examiner* — Matthew Gart
*Assistant Examiner* — Seye Iwarere
(74) *Attorney, Agent, or Firm* — Michael A. Springs; Moore & Van Allen PLLC; Jeffrey R. Gray

(57) ABSTRACT

Provided is a method and system of assigning a level of risk presented to an enterprise by a supplier of goods or services. In at least some embodiments, a tier level and/or a composite supplier risk index (CSRI) is calculated for the supplier based on answers provided to a series of multiple choice questions, wherein the questions are used to provide a measure of the risk elements presented by a supplier. In some embodiments, the risk elements comprise business continuity risk, information security risk, finance risk, operational risk, and supply chain risk. An embodiment can be implemented via a stand-alone computing system or such a system interconnected with other platforms or data stores by a network, such as a corporate intranet, a local area network, or the Internet.

30 Claims, 3 Drawing Sheets

U.S. PATENT DOCUMENTS

2009/0276257 A1* 11/2009 Draper et al. .................. 705/7

OTHER PUBLICATIONS

Extended European Search Report completed Jul. 28, 2010 for European Application No. EP 10 25 0154.

Dun & Bradstreet, Supplier Qualifier Report, Mar. 15, 2006 Archive Access via Internet Archive WaybackMachine. http://replay.waybackmachine.org/20060315210940/http:www.dnb.com/us/dbproducts/supply_management/locate_suppliers/sqr/index/html http:replay.waybackmachine.org/20060316002449/https://www.dnb.com/products/sqrsampl/htm.

Fisher College of Business, The Supply Chain Management Program, Aug. 19, 2006 Archive Access via Internet Archive WaybackMachine. http://replay.waybackmachine.org/20060819105034/http://fisher.osu.edu/centers/scm/executive-education.

Microsoft, Balanced Scorecard for Information Security Introduction, Mar. 6, 2007. Archive Access via Internet Archive WaybackMachine. http://replay.waybackmachine.org/20080212190727/http://technet.microsoft.com/en-us/library/bb821240.aspx.

International Search Report and Written Opinion on the International Searching Authority mailed Mar. 10, 2010 for International Application No. PCT/US2010/022426.

International Search Report and Written Opinion on the International Searching Authority mailed Mar. 10, 2010 for International Application No. PCT/US2010/022431.

International Preliminary Report on Patentability mailed on Aug. 11, 2011 for International Application No. PCT/US2010/022426.

International Preliminary Report on Patentability mailed on Aug. 11, 2011 for International Application No. PCT/US2010/022431.

* cited by examiner

Risk Element Weighted Values for Primary Series of Questions. Multiply by Weighted Question Value of Selected Answer Option to Achieve Risk Element Score.

| Questions with weighted question values | Finance (204) | SCM (206) | BC (208) | Operational (210) | IS (212) |
|---|---|---|---|---|---|
| Q1 | 5 | 3 | - | - | - |
| Q2 | 5 | - | - | - | - |
| Q3 | 5 | 3 | 4 | 5 | - |
| Q4 (Adaptive) | - | 1 | 3 | - | - |
| Q5 | - | 1 | 3 | 2 | - |
| Q6 | 3 | - | - | 1 | 4 |
| Q7 (Adaptive) | - | - | 3 | 3 | - |
| Q8 (Adaptive) | - | - | 5 | 5 | - |
| Q9 (Adaptive) | - | - | 4 | - | - |
| Q10 | - | - | - | 1 | 4 |
| Q11 | - | - | - | 1 | 4 |
| Q12 | - | - | - | - | 1 |
| Q12b (Adaptive) | - | - | - | - | 5 |
| Q13 | - | - | - | - | 1 |
| Q13b (Adaptive) | - | - | - | - | 5 |
| Q14 | - | - | - | - | 5 |
| Q15 | - | - | - | - | 1 |
| Q16 | - | - | 3 | - | 5 |

SUPPLIER STRATIFICATION

CROSS-REFERENCE TO RELATED APPLICATIONS

At least some of what is disclosed in this application is also disclosed in U.S. patent application Ser. No. 12/362,964, entitled, "Supplier Risk Evaluation," and U.S. patent application Ser. No. 12/362,652, entitled, "Supplier Portfolio Indexing," both of which were filed in even date herewith, are commonly assigned, and are incorporated herein by reference.

BACKGROUND

Operation of a successful business today requires the ability to collaborate with companies throughout the world. Further, oftentimes today's businesses are of such a complex nature that numerous suppliers of goods and services are utilized by a single business. To further complicate matters, many providers of goods and services are so complex that they also require collaborative efforts with other businesses in order to meet their own customers' needs. All together, this creates a hierarchy of multiple levels of interactivity that are required just to meet daily logistical needs and keep a business running smoothly.

Risk is an important factor to be considered whenever any kind of interaction is implemented between a contracting business and a supplier. Risk factors that are of particular concern when contracting with suppliers of goods and services include any factors that could expose a business to loss or theft, as suppliers often have direct access to proprietary business systems and information. Businesses therefore tend to expend valuable resources managing and mitigating risk factors inherent to supplier relationships. However, such resources tend to be allocated subjectively and don't tend to take into account all of the factors that may play into a multi-faceted contractor-supplier relationship. Instead, traditional approaches to management of risk posed by suppliers focus on the amount of money spent with a particular supplier, and perhaps also on regulatory requirements that must be met when working with a supplier.

Suppliers may present risks to the business contracting with them in a number of different ways, and it is difficult to compare one supplier to another when many different variables must be taken into consideration. Thus, it can be challenging to know how much overall risk a supplier presents to a business, and how the risk presented by one supplier compares to that presented by a second supplier.

SUMMARY

Embodiments of the present invention provide a method and system of assigning a level of risk presented to an enterprise by a supplier of goods or services. In at least some embodiments, an inherent risk index (IRI) is calculated. The IRI is used to calculate a tier level for the supplier. In some embodiments, a tier level and/or a composite supplier risk index (CSRI) is calculated for the supplier based on answers provided to a series of multiple choice questions. Assignment of the tier level is used to stratify suppliers into different categories of risk presented to the enterprise. In some embodiments, an engagement risk level (ERL) is calculated. In some embodiments, the IRI is indicative of a need for further risk assessment for the information security risk element or the business continuity risk element. In some embodiments, the further risk assessment results in calculation of a remediated risk index (RRI), wherein the RRI is used instead of the IRI to determine a CSRI.

In at least some embodiments, the tier level assignment is achieved by measuring a plurality of risk elements. In at least some embodiments, the risk elements measured comprise a measure of potential risks provided by a supplier. Risk elements comprise business continuity risks, information security risks, finance risks, operational risks, and supply chain risks. In at least some embodiments, the tier level assignment further comprises a measure of the dollar amount expected to be spent with the supplier, wherein the highest risk posed by either the scores from the risk elements or the amount expected to be spent is used to assign the tier level. The assignment of tier level drives the oversight procedures to be followed in managing the supplier.

In some embodiments, there is a primary series of questions and a secondary series of questions. In some embodiments, the primary series of questions comprises up to sixteen multiple choice questions. In some embodiments, the secondary series of questions comprises up to forty one multiple choice questions. Each multiple choice question addresses at least one risk element.

In at least some embodiments, the answer options for at least some of the multiple choice questions are each assigned a weighted question value (also referred to as a question value), which is used in calculating the risk element score for the supplier. In some embodiments, each risk element measured for a question includes two values. The first value is a risk element weighted value. The second value is a risk element score, which is calculated by multiplying the weighted question value assigned to the answer option selected by the risk element weight value.

In some embodiments, the invention is implemented via either a stand-alone instruction execution platform or such a platform interconnected with other platforms or data stores by a network, such as a corporate intranet, a local area network, or the Internet. A computer program product or computer program products contain computer programs with various instructions to cause the hardware to carry out, at least in part, the methods and processes of embodiments of the invention. Data sets may comprise question value data, risk element weighted value data, risk element score data, and data for determining IRI, RRI, CSRI, and supplier tier level. Data sets may be stored locally or accessed over a network. Dedicated software can be provided to implement the invention, or alternatively, a spreadsheet program can be used to implement embodiments of the invention. In either case a user screen is operable to receive appropriate input and to provide output.

BRIEF DESCRIPTION OF THE DRAWINGS

FIG. 2 is a depiction of the risk element weighted values assigned for the primary series of questions in some embodiments.

DETAILED DESCRIPTION OF THE INVENTION

Figure 1:
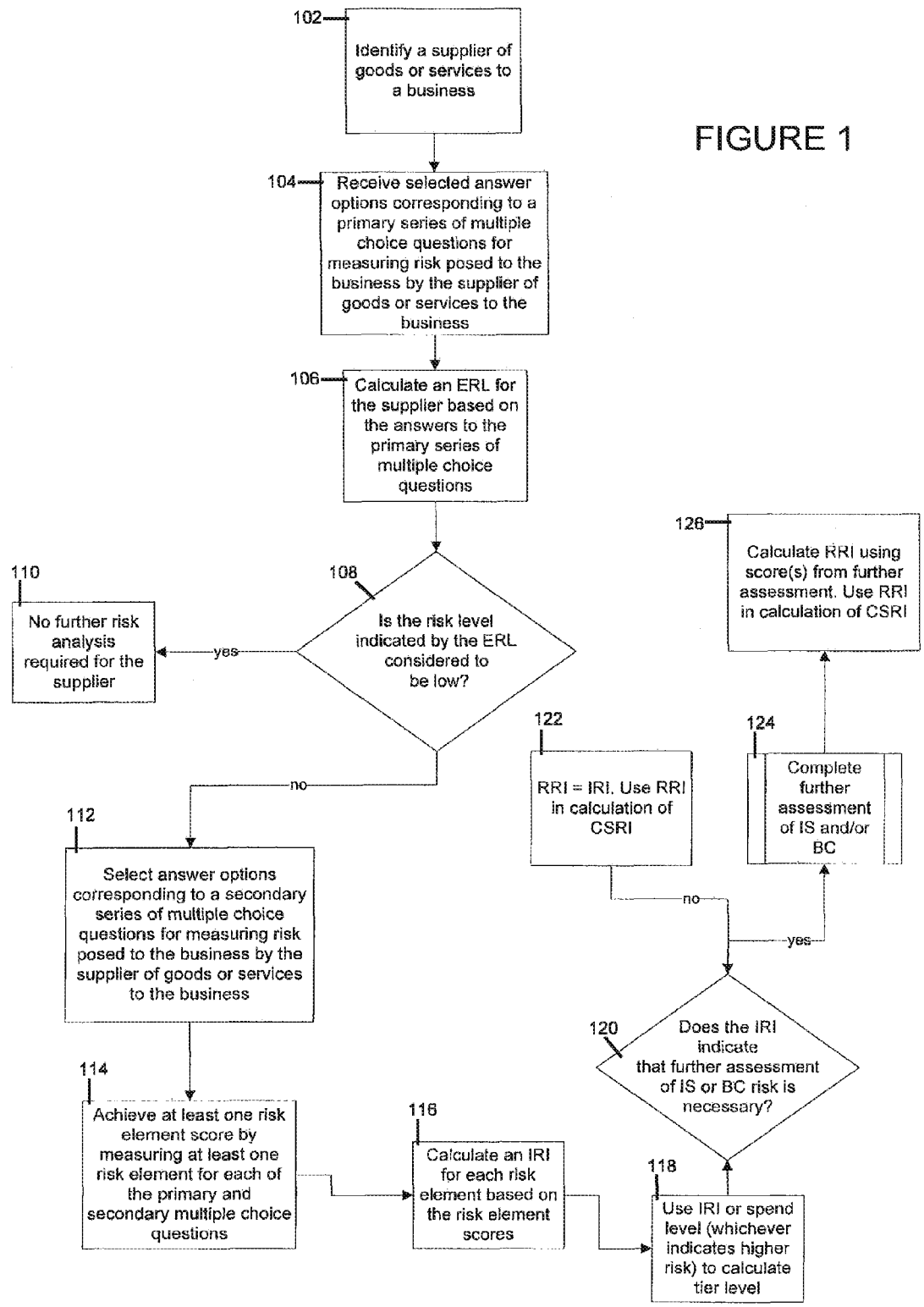
FIG. 1 is a flow chart that illustrates a method of using embodiments of the invention.

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, stages, processes, and features of various embodiments of systems, apparatus, and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary.

The present invention can be embodied in computer software or a computer program product. An embodiment may include a spreadsheet program and may also include appropriate macro programs, algorithms, or plug-ins. An embodiment may also consist of a custom-authored software application for any of various computing platforms. One specific example discussed herein involves the use of a Windows™ personal computing platform running Microsoft Excel™ spreadsheet software. It cannot be overemphasized that this embodiment is an example only. It will also be readily understood that the inventive concepts described herein can be adapted to any type of hardware and software platform using any operating system including those based on Unix™ and Linux. In any such embodiments, the instruction execution or computing platform in combination with computer program code instructions form the means to carry out the processes of the invention.

Embodiments of the present invention provide a method and system of stratifying a supplier of goods or services. A tier level is calculated for the supplier in part based on answers provided to a series of multiple choice questions, wherein the multiple choice questions are used to identify and measure risk elements associated with the supplier.

Embodiments of the present invention can find use in a global supply chain management program for an enterprise such as a bank, manufacturing company, insurance company, or any other business. Such a management program can constitute a framework of governance, processes and tools to manage enterprise supplier risk and performance annually, or at any other frequency desired. As part of such a framework, supplier managers and suppliers can submit program deliverables which enable the enterprise to assess, manage, and mitigate supplier performance and risk issues in a timely manner.

Risk may need to be managed to internal standards developed by the enterprise. Additionally, risk may need to be managed due to external regulations and standards. For example, a financial institution such as a bank in the United States may need to manage risk to meet requirement imposed by the government, such as those specified in statutes such as the USA Patriot Act, the Gramm-Leach-Bliley Act, and the Sarbanes-Oxley Act.

Banks in the United States are also regulated by the Office of the Comptroller of the Currency (OCC) and need to mitigate risks imposed by having to comply with OCC regulations. The focus of the OCC regulations is on safety and soundness. For a financial enterprise, operational risk is a critical concern. Operational risk is the risk of direct and indirect loss due to people, processes, technology, regulatory, external events, execution, or reputation.

Supplier management is concerned with one form of external events risk. External events risk is the risk from outside the businesses' normal span of control. Events risk may include risks posed by vendors, alliances, and service providers. Third-party supplier services can be considered an extension of an enterprise's internal operations. It is the enterprise's responsibility to ensure the quality of operations and controls provided by a supplier.

Suppliers can be indexed using a supplier portfolio indexing (SPI) tool. An example SPI tool that can be used with example embodiments of the present invention is described in U.S. patent application Ser. No. 12/362,652, entitled, "Supplier Portfolio Indexing," filed on even date herewith, the entire disclosure of which is incorporated herein by reference.

In example embodiments, the SPI consists of three equally-weighted metrics. One metric is referred to as the composite supplier risk index (CSRI). A second metric is the supplier manager certification status. The third metric is the supplier performance scorecard metric. Described in detail herein is the CSRI metric.

The CSRI in the example embodiments is determined by five categories of risk, each defined by a risk element score. The five risk element scores used to calculate the CSRI in this example are information security score, business continuity score, financial score, operational risk score and supplier survey score. The supplier survey score defines contract related risk and is determined from survey questions posed to the supplier. In some embodiments, each of these element scores can be weighted equally. However, it may be advantageous to weight them differently. Weighting can be developed for a specific enterprise as needed. For at least some financial institutions, a weighting 30% for the information security and business continuity element scores, 16% for the operational risk elements score, and 12% for each of the supplier survey element score and the financial element score has been found to be effective. The weighted risk element scores are added together to produce the CSRI on a 100-point scale.

The risk element scores and the CSRI in some embodiments as described herein are obtained through supplier stratification. A tier level is calculated for the supplier in part based on answers provided to a series of multiple choice questions, wherein the multiple choice questions are used to identify and measure risk elements associated with the supplier. It is understood by one of skill in the art that the tier level may be aligned to any risk element(s) seen to be potentially harmful to the business. In at least some embodiments, the assigned tier level indicates a measure of risk across defined risk elements, measured by use of a series of multiple choice questions. In another embodiment, the tier level comprises a measure of the five risk elements used in the CSRI. However, additional risk elements can also be measured by the stratification tool. In stratification, the term "risk" refers to the probability that there will be a loss to the business. The loss may be a direct financial loss. The loss may also be nonfinancial on its face, such as damage to the business's reputation amongst customers.

Multiple choice and/or yes/no questions can be used not only in the stratification portion of obtaining an SPI according to example embodiments of the invention, but also to gather input for the other metrics that make up the SPI. Such multiple choice questions provide an interface between the user and the sophisticated risk analysis underlying the multiple choice questions. Each question has multiple answer options that are each assigned a question value, wherein the question values fall within a predetermined value range, for example within a range.

Throughout this discussion, it should be noted that in the example provided an inverted scoring logic is implemented with respect to risk, so that larger scores correlate with lower risk. However, the SPI takes performance into account, and so is not inverted with respect to performance. The result for the SPI is that a higher number correlates to better performance.

In some embodiments, stratification can produce two risk measurements, an initial measurement of "inherent" risk, which can be reflected in an inherent risk index (IRI) and a measurement of remediated risk, which can be reflected in a remediated risk index (RRI). Remediation is the process of the supplier putting processes and/or safeguards in place to reduce the risk uncovered initially when the IRI was determined. If no remediation is undertaken, either because none is needed, or for any other reason, the RRI will be the same as the IRI. In either case, it would normally be the risk element scores determined when the RRI is calculated that would be used to determine the CSRI, which would be used in turn to determine the SPI.

It should also be noted that in some enterprises, a threshold may be set below which the information security element score obtained from survey questions posed by the stratification tool would not be initially acceptable, with the result being that an information security assessment of the supplier would be undertaken by the enterprise. Likewise, a threshold may be set below which the business continuity element score obtained from survey questions posed by the stratification tool would not be initially acceptable, with the result being that a business continuity assessment would be undertaken by the enterprise. In either situation, or if both situations apply as the case may be, the score from the assessment conducted by the enterprise would normally become the element score used to determine the CSRI.

Supplier stratification provides a number of outputs. Supplier stratification provides identification of whether there is a requirement for an information security or business continuity assessment of a supplier. Supplier stratification provides an initial supplier risk level measurement called an engagement risk level (ERL) assessment of low, medium or high. Supplier stratification also provides a tier level assignment indicative of a more complete measurement of the risk posed by the supplier to the enterprise. Supplier stratification still further provides a CSRI, as noted above. An example of use of the CSRI in further risk evaluation and supplier management is described in U.S. patent application Ser. No. 12/362,652, entitled, "Supplier Portfolio Indexing," filed on even date herewith, the entire disclosure of which is incorporated herein by reference.

Supplier stratification provides an engagement risk level (ERL) assessment of low, medium or high. The ERL is calculated in at least some embodiments from the answers provided to the first sixteen questions of the supplier stratification tool. If the answers selected provide an ERL score of low, there is no need for further evaluation and stratification of the supplier. If the answers selected provide an ERL of medium or high, then the rest of the questions provided by the supplier stratification tool are answered and evaluated, resulting in assignment of a proposed tier level for the supplier.

For completeness it should be noted that as part of supplier stratification, risks posed to a business by a supplier of goods or services, wherein the supplier subcontracts the production of the goods or services to a third entity, produces the goods or services in a non-domestic country, or uses a subcontractor in a non-domestic country to provide the goods or services, can also be determined. A risk score is calculated and is used to drive risk mitigation and management of the supplier. This risk score is again calculated from answers to a series of multiple choice questions, wherein the multiple choice questions are used to establish risk factors associated with such a supplier's situation. An example of risk evaluation with respect to producing goods or services in a non-domestic country is described in U.S. patent application Ser. No. 12/362,964, entitled, "Supplier Risk Evaluation," filed on even date herewith, the entire disclosure of which is incorporated herein by reference.

In summary, and as an exemplary embodiment, supplier stratification is described in more detail as follows. A business, sometimes referred to herein as a contractor or an enterprise, often enters into contracts with other business entities for the purpose of purchasing goods and services. Supplier stratification is used to assign a tier level to a supplier. The tier level gives an indication of the overall risk posed to the business by the supplier.

It is understood by one of skill in the art that the tier level may be aligned to any risk element(s) seen to be potentially harmful to the business. In at least some embodiments, the assigned tier level comprises a measure of risk across defined risk elements, measured by use of a series of multiple choice questions. In one embodiment, the tier level comprises a measure of four risk elements. In another embodiment, the tier level comprises a measure of five risk elements. In a further embodiment, the tier level comprises a measure of six risk elements. The term "risk" refers to the probability that there will be a loss to the business. The loss may be a direct financial loss. The loss may also be nonfinancial on its face, such as damage to the business's reputation amongst customers.

Stratification of a supplier of goods or services requires input in the form of answers to a series of multiple choice questions. The multiple choice questions provide a simple interface between the user and the sophisticated risk analysis underlying the multiple choice questions. Each question has multiple answer options that are each assigned a question value, wherein the question values fall within a predetermined value range, for example within a range of 0-100 inclusive, or within a range of 0-9 inclusive. The purpose of weighting the answer options for each question within the same predetermined value range is to normalize the output. An inverted scoring logic is implemented, so that a larger question value correlates with lower risk. Based on the answers to the questions, supplier stratification provides a tier level assignment that is indicative of the overall risk posed by the specific supplier for the goods and services to be supplied by that supplier.

In at least some embodiments, supplier stratification provides output in the form of graphs and tables. The output is objective, and is provided in numerical data formats that enable direct comparison of the risks posed by different suppliers. For example, the assigned tier level is a number that can be meaningfully compared between suppliers. Thus, the assigned tier level gives the business an objective measure of the risk posed by a supplier.

FIG. 1 is a flow chart depicting an overview of the supplier stratification process in at least some embodiments. A supplier of goods or services is identified by a business (or enterprise, for example, a financial institution) 102. The supplier stratification survey then receives selected answer options for a plurality of multiple choice questions, wherein the questions presented are a primary series of questions 104. The questions are for the purpose of measuring the risk posed to the business by the supplier.

An engagement risk level (ERL) metric is calculated for the supplier based on the answers selected to the primary series of multiple choice questions 106. The ERL serves as an initial indicator of the risk posed by the supplier. If the ERL score indicates that the supplier poses a low risk 108, no further risk evaluation of the supplier is required 110. If the ERL indicates that the supplier poses a medium or a high risk 112, then answers to a secondary set of multiple choice questions is required for the supplier.

After answers have been selected for all of the multiple choice questions presented by the supplier stratification tool, at least one risk element score is achieved by measuring at least one risk element for each of the primary and secondary multiple choice questions 114. A multiple choice question may measure more than one risk element. In the examples presented herein, five risk elements are measured, including information security, business continuity, finance, operational risk, and supply chain management. In at least some embodiments, the risk element score is achieved by multiplying the question value (a weighted and normalized value assigned to each answer option within each question) by the risk element weighted value (a weighted and normalized value assigned to each risk element measured by a question).

Once the risk element scores have been achieved for all of the risk elements measured by a question, the risk element scores are used to calculate an inherent risk index (IRI) for each risk element 116. The IRI serves as a sort of "raw" risk metric for each risk element measured. In at least some embodiments, some of the risk element areas are particularly sensitive and may require closer examination to insure that all possible remediation measures have been addressed before the supplier is fully engaged by the business. In the examples presented herein, the risk elements of information security and business continuity may require further assessment 118. The trigger for further assessment is an IRI score of 85 or lower in either business continuity or information security risk elements.

The IRI and the dollar amount expected to be spent with the supplier (otherwise known as the "spend level") are both considered when determining the tier level to be assigned to the supplier. The IRI or the spend level, whichever is indicative of highest risk, is used to calculate the supplier tier level 118. The assignment of supplier tier level stratifies suppliers into different groups, or tiers, and thus drives the management and oversight procedures that the financial institution utilizes with a specific supplier. A tier level assignment of one, for example, indicates that at least one of IRI and spend level poses high risk to the financial institution. The tier one supplier is therefore subjected to rigorous oversight procedures in an effort to manage and mitigate the risks posed.

The IRI serves as an indicator as to whether further assessment of information security or business continuity risk is required 120. If the IRI indicates that further assessment is required, the risk element of concern is further evaluated outside of the supplier stratification tool. One of skill in the art understands that such further evaluation would be highly specialized and might include, for example, insuring that the supplier complies with both the business's own internal operating standards and also with any regulatory requirements that may be in operation. Thus, the details of such further assessment are not important for the purpose of discussing embodiments of the present invention. However, it is noted that no matter what the specifics of the further assessment, the final score resulting from the further assessment must be on a scale of 0-100 so that it can be plugged back into the supplier stratification tool's scoring scheme.

After any required further assessment of risk elements is completed, a remediated risk index (RRI) is calculated. If no remediation, or further assessment, is required, the RRI value is equivalent to the IRI value 122. If further assessment is required as determined by the IRI score, any values calculated in the further assessment 124 will be used in calculating the RRI 126. In such cases, the RRI value may be different from the IRI value, and the RRI value will represent a remediated value.

Finally, the RRI is used to calculate a composite supplier risk index (CSRI) for the supplier (as shown in boxes 122 and 126), thus providing an overall indication of the level of risk posed by the supplier. Supplier stratification provides scores for each individual risk element, so that the overall tier level can be disaggregated. This enables identification of the risk elements posing the highest risk, and enables specific mitigation measures to be implemented to address the risk posed.

The following example presents supplier stratification as it is applied in some embodiments of the invention. Supplier stratification is used to determine how much and what types of risk are posed by a supplier to the business to which it is supplying goods or services and type of management/oversight required by the business. As used here, the term "contractor" is used to refer to the primary business that has entered into a contractual agreement with a "supplier" for goods or services. A "supplier" is a business that provides goods or services. A "subcontractor" is an entity hired by a supplier. A subcontractor does not have a direct contractual agreement with the contractor. "Non-domestic country work" work refers to work that is located in a country other than that in which the contract between the contractor and the supplier was executed.

Each of the multiple choice questions has associated with it at least three numerical values that are utilized in the assignment of supplier tier level. The first is a question value, which is a weighted value assigned to each of the answer options presented with a multiple choice question. The second and third values are two values that are associated with each risk element measured by the multiple choice question. Some multiple choice questions provide a measure for a plurality of risk elements. The two risk element metrics are the risk element weighted value, which is a predetermined value assigned to reflect the significance of measuring the risk element by that specific question, and the risk element score, which is calculated by multiplying the weighted question value and the risk element weighted value. The weighted question values and the risk element weighted values are all normalized and are assigned such that a higher number indicates more risk and a lower number indicates less risk. In some embodiments, the weighted question values and the risk element weighted values are assigned within a range of 0-5 for normalization of values.

FIG. 2 provides a conceptual illustration of how risk element weighted values may be assigned to the different multiple choice questions. The questions Q1-Q16 as shown in column 202 of FIG. 2 represent the primary series of questions as described below in example embodiments of the invention. The grid in FIG. 2 illustrates how a single question may provide scoring in one or a plurality of risk element categories. The risk element categories are depicted in FIG. 2 as Finance (column 204), SCM (Supply Chain Management, column 206), BC (Business Continuity, column 208), Operational (column 210), and IS (Information Security, column 212). Risk element scores are achieved by multiplying the weighted question value for the answer option selected by the risk element weighted value for that question. The risk element weighted values of Q17-Q41 are not depicted in order to maintain the clarity of the illustration, but would function in conceptually the same way.

The following description is based on an exemplary implementation of an embodiment of the invention in a financial institution, but it is understood that the present invention could be useful in many different types of businesses and the example herein is not intended to limit the use of the invention to any particular industry. The term "financial institution" refers to an institution that acts as an agent to provide financial services for its clients or members. Financial institutions generally, but not always, fall under financial regulation from a government authority. Financial institutions include, but are not limited to, banks, building societies, credit unions, stock brokerages, asset management firms, savings and loans, money lending companies, insurance brokerages, insurance underwriters, dealers in securities, and similar businesses.

When the financial institution, or a user on behalf of the financial institution, initiates use of the supplier stratification tool, the first question (Q1) asks for the expected annual spend level of the business with the supplier. This question has four answer options, with a weighted assigned question value for each option as follows. The first answer option "greater than or equal to $150 million" is assigned a question value of 5. The second answer option "greater than or equal to $35 million and less than $150 million" is assigned a question value of 4. The third answer option "greater than or equal to $5.5 million and less than $35 million" is assigned a question value of 2. The fourth answer option "less than $5.5 million" is assigned a question value of 1.

Q1 provides risk element measurements for two risk elements: finance risk and supply chain management risk. Each of these two risk elements has two values associated with it for Q1. First, each risk element has a risk element weighted value. For the finance risk element, the risk element weighted value is 5, indicating that the subject matter addressed by Q1 carries high risk with respect to the finance risk element. For the supply chain management risk element, the risk element weighted value is 3, indicating that the subject matter addressed by Q1 carries moderate risk with respect to the supply chain management risk element.

If the answer selected for Q1 is the fourth answer option of "less than $5.5 million", the assigned question value is 1. Therefore, the risk element scores for Q1 would be 5×1=5 for the finance risk element, and 3×1=3 for the supply chain management risk element.

The multiple choice questions presented in the supplier stratification tool each functions in basically the same way as illustrated above for Q1 in providing information for the final tier level assignment for the supplier. One of skill in the art understands that the number of questions, as well as the content of the questions, may differ without changing the scope of the invention as described herein. In some embodiments, a primary series of questions in the supplier stratification survey may comprise up to sixteen multiple choice questions. In some embodiments, a primary series of questions and a secondary series of questions in supplier stratification survey may comprise up to forty one multiple choice questions.

The second question (Q2) asks what the annual spend is projected to be if the supplier stratification survey is being conducted for a new contract, product, or service. The assigned question values for Q2 are 5 for "High" and 1 for "Low". Q2 addresses the risk element of finance, and the risk element weighted value is 5. The answer options, and the corresponding question values, are "greater than or equal to $1 million", with a question value of 5 and "less than $1 million", with a question value of 1. Thus, the risk element score for the risk element of finance would be 5×5=25 if the selected answer is "High", and 1×5=5 if the selected answer is "Low".

The third question (Q3) asks what effect the loss or deterioration of the supplier's goods or services, or inaccurate processing or reporting thereof, would have on the financial institution. This question draws data from a table called the operational risk impact matrix, which comprises consideration of operational risk categories comprising regulatory risk, reputational risk, revenue risk, risk to competitive ability, and risk to customers or employees. A risk level of high, medium or low can be assigned to each of the five categories, wherein answer option high has a weighted question value of 5, answer option medium has a weighted question value of 3, and answer option low has a weighted question value of 1. The scoring for Q3 is kept at a most conservative level by requiring that the operational risk category present that provides the highest risk level guide the selection of the answer option for this question, insuring that the operational risk category providing the highest level of risk is accounted for in the stratification of the supplier. Thus, if any one of the five categories is perceived to be a high risk, answer option high will be selected and a weighted question value of 5 will be used to compute the risk element score.

Q3 supplies information across four risk elements, including business continuity risk, finance risk, operational risk, and supply chain management risk. Q3 is an important question in terms of supplying information for calculating the final tier level of the supplier, as can be seen by looking at the values assigned to the risk element weighted values. The risk element weighted values, which are assigned on a scale of 1-5, are 4 for business continuity, 5 for finance, 5 for operational risk, and 3 for supply chain management. Each of the four risk element scores is calculated as described above for Q1, by multiplying the question value by the risk element weighted value.

The fourth question (Q4) asks if there are competing suppliers for the same goods or services offered by the supplier. This is a yes or no question. Note that if the response to Q3 was "low", Q4 will not be offered to the user. This is an example of the adaptive nature of embodiments of the present invention, wherein the questions presented to the user are adapted based on answers selected for previous questions. Q4 supplies information affecting the business continuity and supply chain management risk elements. The question values for the answer options in Q4 are 1 for yes and 5 for no. The risk element weighted values for Q4 are 3 for business continuity risk and 1 for supply chain management risk.

The fifth question (Q5) asks whether the supplier produces goods or services in a non-domestic country. This question addresses whether any of the business's transactions with the supplier will have any components that take place or are addressed outside of the country in which the business is located, or outside of which the supply contract was executed between the business and the supplier. The question values for Q5 are 1 for yes and 5 for no. The risk element weighted values are 3 for business continuity, 2 for operational risk, and 1 for supply chain management.

The sixth question (Q6) asks if the supplier's goods or services depend on intellectual property provided by the business. Q6 addresses the risk elements of information security, finance, and operational risk. The question values for Q6 are 5 for yes and 1 for no. The risk element weighted values are 4 for information security, 3 for finance, and 1 for operational risk.

The seventh question (Q7) asks how long it would take to transition to an alternate source of the products or services provided by the supplier. Q7 addresses the risk elements of business continuity and operational risk. The answer options and corresponding question values for Q7 are 5 for "more than 12 months", 4 for "6-12 months", 3 for "1-6 months", and 1 for "less than one month". The risk element weighted values are 3 for business continuity and 3 for operational risk.

Note that if answer option "low" was selected for Q3, the user will not be presented with questions 7-9.

The eighth question (Q8) asks whether a supplier's inability to deliver goods or services during a disaster (or other event) would have an unacceptable impact on the business's ability to deliver to customers. Q8 addresses the risk elements of business continuity and operational risk. The question values for Q8 are 5 for answer option yes and 1 for answer option no. The risk element weighted values are 5 for business continuity and 5 for operational risk. Again, note that if answer option "low" was selected for Q3, the user will not be presented with Q8.

The ninth question (Q9) asks whether a supplier's inability to deliver goods or services during a disaster (or other event) would have an unacceptable impact on the business's ability to maintain market position. Q9 addresses the risk element of business continuity. The question values for Q9 are 5 for answer option yes and 1 for answer option no. The risk element weighted value is 4 for business continuity. Again, note that if answer option "low" was selected for Q3, the user will not be presented with Q9.

The tenth question (Q10) asks if the nature of the supplier's goods or services requires that the supplier, or a subcontractor hired by the supplier, have regular physical access to the business's facilities. The term "subcontractor" as used herein refers to an entity hired by the supplier to perform work related to goods or services to be provided to the business through a contract between the business and the supplier. Q10 addresses the risk elements of information security and operational risk. The question values for Q10 are 5 for answer option yes and 1 for answer option no. The risk element weighted values are 4 for information security and 1 for operational risk.

The eleventh question (Q11) asks if the supplier, or a subcontractor hired by the supplier, has direct contact with the business's customers. Q11 addresses the risk elements of information security and operational risk. The question values for Q11 are 5 for answer option yes and 1 for answer option no. The risk element weighted values are 4 for information security and 1 for operational risk.

The twelfth question (Q12) asks if the supplier has access to, processes, stores, transmits, or transports the business's private customer information. Q12 addresses the risk element of information security. The answer options for Q12 are "sensitive" with a question value of 5, "public" with a question value of 3, and "no" with a question value of 1. The risk element weighted value is 1 for information security.

Q12 has a subpart, Q12b, that is presented to the user if the answer option selected for Q12 is other than "no". This is another example of the adaptive nature of the supplier stratification tool. Q12b asks if the data will move to a country outside the customer's place of residence. The answer options for Q12b are "yes" with a question value of 5 or "no" with a question value of 1. The risk element weighted value is 5 for information security.

The thirteenth question (Q13) asks if the supplier has access to, processes, stores, transmits, or transports the business's employee information. Q13 addresses the risk element of information security. The answer options for Q13 are "sensitive" with a question value of 5, "public" with a question value of 3, and "no" with a question value of 1. The risk element weighted value is 1 for information security.

Q13 has a subpart, Q13b, that is presented to the user if the answer option selected for Q13 is other than no. Q13b asks if the data will move to a country outside the employee's place of residence. The answer options for Q13b are "yes" with a question value of 5 or "no" with a question value of 1. The risk element weighted value is 5 for information security.

The fourteenth question (Q14) asks if the supplier has access to, processes, stores, transmits, or transports the business's business customer information. Q14 addresses the risk element of information security. The answer options for Q14 are "yes" with a question value of 5 and "no" with a question value of 1. The risk element weighted value is 1 for information security.

The fifteenth question (Q15) asks if the supplier has access to, processes, stores, transmits, or transports information proprietary to the business. Q15 addresses the risk element of information security. The answer options for Q15 are "yes" with a question value of 5 and "no" with a question value of 1. The risk element weighted value is 1 for information security.

The sixteenth question (Q16) asks if the supplier will have access to the business's systems, such as computer systems. Q16 addresses the risk elements of business continuity and information security. The question values for Q16 are 5 for answer option yes and 1 for answer option no. The risk element weighted values are 3 for business continuity and 5 for information security.

An engagement risk level (ERL) is calculated in at least some embodiments from the answers provided to the first sixteen questions of the supplier stratification tool. If the answers selected provide an ERL score of low, there is no need for further evaluation and stratification of the supplier. If the answers selected provide an ERL of medium or high, then the rest of the questions provided by the supplier stratification tool are answered and evaluated, resulting in assignment of a proposed tier level for the supplier. The risk elements of information security, business continuity, and operational risk are used to calculate the ERL. The risk score indicative of highest risk is the one used for calculating the ERL. For example, risk element scores of "high" or "significantly high", which are risk element scores of less than or equal to 54, result in a high ERL score. Risk element scores of 55-99 result in a medium ERL score. There is no "low" ERL score value, as any supplier posing low risk is not still undergoing evaluation at this stage of supplier stratification.

The seventeenth question (Q17) asks if the supplier will host public internet applications for the business. Q17 addresses the risk element of information security. The answer options for Q17 are "yes" with a question value of 5 and "no" with a question value of 1. The risk element weighted value is 5 for information security.

The eighteenth question (Q18) asks if the supplier has ever experienced data loss or theft. Q18 addresses the risk element of information security. The answer options for Q18 are "yes" with a question value of 5 and "no" with a question value of 1. The risk element weighted value is 5 for information security.

The nineteenth question (Q19) requires identification of modes of data transmission between the supplier and the business. Q19 addresses the risk element of information security. The answer options for Q19, with corresponding question values in parentheses, include "electronic" (5), "physical—hard copy documentation access" (3), "physical—electronic media access" (5), "sensitive data remains on business's systems" (1), and "other" (5). The risk element weighted value is 5 for information security.

The twentieth question (Q20) asks whether the supplier handles data on a regular basis or an unscheduled basis (for example, only when system maintenance is required). Q20 addresses the risk element of information security. The answer options for Q20, with corresponding question values in parentheses, include "unscheduled basis" (1) and "regular basis" (2). The risk element weighted value is 0.5 for information security.

The twenty first question (Q21) asks for an estimate of the number of customers and/or employees the supplier will affect, either directly or through their relationship with the financial institution. Q21 addresses the risk element of information security. The answer options for Q21, with corresponding question values in parentheses, include "<1000" (1), "1000-10,000" (2), "10,000-100,000" (3), "100,000-1 million" (4), and ">1 million" (5). The risk element weighted value is 1 for information security.

The twenty second question (Q22) asks whether a combination of the customer data and/or associate data, or other factors, cause the data to become proprietary to the business or otherwise more sensitive. Q22 addresses the risk element of information security. Questions 22-24 use a different scoring approach than questions Q1-Q21 as described herein in this embodiment. The answer options for Q22, with corresponding question values in parentheses, include "yes" (25) or "no" (n/a). There is no question value assigned to Q22 as there is to each of the previous questions. The risk element weighted value is 25 for information security, and there is no risk element score calculated, since there is no question value. Rather, the risk element weighted value is used as the risk element score. Note that this is the same outcome as if the question value for answer option "yes" was 5 and the risk element weighted value was 5. While the final risk element score is normalized to the same scale as that of Q1-Q21, he difference from the question scoring above is that no value is reported if the answer is no.

The twenty third question (Q23) asks whether, if customer information is accessed by the supplier, a combination of name, address, or phone number combined with one or more of the following: social security number, customer account number, driver's license number, and authentication information. Q23 addresses the risk element of information security. Questions 22-24 use a different scoring approach than questions Q1-Q21 as described herein in this embodiment. The answer options for Q23, with corresponding question values in parentheses, include "yes" (25) or "no" (n/a). As for Q22, there is no question value assigned to Q23. The risk element weighted value is 25 for information security, and there is no risk element score calculated, since there is no question value. Rather, the risk element weighted value is used as the risk element score, just as it is for Q22.

The twenty fourth question (Q24) asks whether, if employee information is accessed by the supplier, a combination of name and any two or more of the following is ever available: social security number, income, personnel records, medical records, and employee benefits information. Q24 addresses the risk element of information security. Questions 22-24 use a different scoring approach than questions Q1-Q21 as described herein in this embodiment. The answer options for Q24, with corresponding question values in parentheses, include "yes" (25) or "no" (n/a). As for Q22 and Q23, there is no question value assigned to Q24. The risk element weighted value is 25 for information security, and there is no risk element score calculated, since there is no question value. Rather, the risk element weighted value is used as the risk element score, as it is for Q22 and Q23.

The twenty fifth question (Q25) asks who within the business the supplier provides goods or services to. Q25 addresses the risk elements of information security and supply chain management. The answer options for Q25, with corresponding question values in parentheses, include "single line of business" (1), "multiple lines of business" (3), and "across the enterprise" (5). The risk element weighted value is 3 for information security and 3 for supply chain management.

The twenty sixth question (Q26) asks for a description of the geographical scope of the relationship between the supplier and the business. Q26 addresses the risk element of operational risk. The answer options for Q26, with corresponding question values in parentheses, include "local" (1), "regional" (2), "national" (4) and "worldwide" (5). The risk element weighted value is 1 for operational risk.

The twenty seventh question (Q27) asks for supplier performance location. Q27 has two subparts, Q27a and Q27b, that may feed into the values for Q27. Q27a asks where the supplier is performing work for the business. The answer options are provided in a dropdown menu, as country names and a corresponding country risk rating. If the supplier is performing work in more than one country, for the purpose of answering Q27a, the user selects the country with the highest risk rating. The risk rating serves as the question value for Q27a.

The table that provides lists of countries and their corresponding risk values for Q27 may be provided by a source outside of the supplier stratification survey, as such information may be useful in other applications as well. In one embodiment, the table may be maintained by the financial institution for its own internal use in various areas of business. In another embodiment, the table may be obtained from another source or industry, such as the insurance industry. Each country in the table is assigned a country risk rating based on a plurality of attributes, wherein a high country risk rating corresponds to a high risk.

Q27b asks where the supplier is performing work involving sensitive data belonging to the business. As for Q27a, if there is more than one country in which the supplier is performing work involving sensitive data belonging to the business, the user selects the country with the highest risk rating. If the supplier is not performing work involving sensitive data belonging to the business, Q27b is skipped.

The risk elements addressed by Q27 include information security, operational risk, and supply chain management. The risk element weighted values are 5 for information security, 3 for operational risk, and 3 for supply chain management. The risk score for Q27 is calculated by multiplying the single highest risk rating assigned to one of the countries in which the supplier performs work by, in a separate calculation, each applicable risk element weighted value to derive a risk element score for each applicable risk element.

The twenty eighth question (Q28) asks whether the supplier uses significant subcontractors to provide goods or services to the business. A "significant supplier" is a supplier that has access to the business's sensitive information, has access to the business's physical facilities or systems on a regular basis, or has fiduciary responsibility. Q28 addresses the risk elements of information security, operational risk, and supply chain management. The answer options for Q28 are "yes" with a question value of 5 and "no" with a question value of 1. The risk element weighted values are 5 for information security, 2 for operational risk, and 1 for supply chain management. If answer option "no" is selected, questions 29 and 30 are not presented to the user.

The twenty ninth question (Q29) asks for significant subcontractor performance location. Q29 has two subparts, Q29a and Q29b, that may feed into the values for Q29. Q29a asks where the significant subcontractor is performing work for the business. The answer options are provided in a dropdown menu, as country names and a corresponding country risk rating. If the significant subcontractor is performing work in more than one country, for the purpose of answering Q29a, the user selects the country with the highest risk rating. The risk rating serves as the question value for Q29a.

Q29b asks where the significant subcontractor is performing work involving sensitive data belonging to the business. As for Q29a, if there is more than one country in which the significant subcontractor is performing work involving sensitive data belonging to the business, the user selects the country with the highest risk rating. The supplier stratification tool always defaults to the selected answer representing the highest risk value posed for a particular question or risk element. If the significant subcontractor is not performing work involving sensitive data belonging to the business, Q29b is not presented to the user.

The risk elements addressed by Q29 include information security, operational risk, and supply chain management. The risk element weighted values are 5 for information security, 1 for operational risk, and 1 for supply chain management. Using the country risk rating table, the risk score for Q29 is calculated the same way it is calculated for Q27. Thus, the risk score for Q29 is calculated by multiplying the single highest risk rating assigned to one of the countries in which the supplier performs work by, in a separate calculation, each applicable risk element weighted value to derive a risk element score for each applicable risk element.

The thirtieth question (Q30) asks if the supplier is highly dependent on a single-source subcontractor with no competitors. Q30 addresses the risk elements of operational risk and supply chain management. The answer options for Q30 are "yes" with a question value of 5 and "no" with a question value of 1. The risk element weighted values are 1 for operational risk and 1 for supply chain management.

The thirty first question (Q31) asks if the supplier is highly dependent on a single-source subcontractor with no competitors. Q31 addresses the risk elements of finance and operational risk. The answer options for Q31 are "yes" with a question value of 5 and "no" with a question value of 1. The risk element weighted values are 4 for finance and 1 for operational risk.

The thirty second question (Q32) asks whether the supplier will conduct account management, customer service, or collection activities on behalf of the business. Q32 addresses the risk elements of finance and operational risk. The answer options for Q32 are "yes" with a question value of 5 and "no" with a question value of 1. The risk element weighted values are 3 for finance and 1 for operational risk.

The thirty third question (Q33) asks whether the supplier will conduct underwriting analysis or set up product programs on behalf of the business, which in the present example is a financial institution. Q33 addresses the risk elements of finance and operational risk. The answer options for Q33 are "yes" with a question value of 5 and "no" with a question value of 1. The risk element weighted values are 4 for finance and 1 for operational risk.

The thirty fourth question (Q34) asks whether the supplier will conduct underwriting analysis or set up product programs on behalf of the business, which in the present example is a financial institution. Q34 addresses the risk element of finance. The answer options for Q34 are "yes" with a question value of 5 and "no" with a question value of 1. The risk element weighted value is 5 for finance.

The thirty fifth question (Q35) asks for identity of the supplier's financial viability risk rating. Q35 addresses the risk elements of finance and supply chain management. The answer options for Q35 are "1-3" with a question value of 1, "4-5" with a question value of 2, "6-7" with a question value of 4, and "8-10" with a question value of 5. The risk element weighted values are 5 for finance and 3 for supply chain management.

The thirty sixth question (Q36) asks for the longest timeframe acceptable before the business absolutely must have the supplier restore normal services after a disaster or other event. Q36 addresses the risk element of business continuity. The answer options for Q36 are "less than 4 hours" with a question value of 5, "4-24 hours" with a question value of 4, "24-48 hours" with a question value of 3, "over 48 hours" with a question value of 1, and "not applicable" with a question value of 1. The risk element weighted value is 5 for business continuity. Note that if answer option "low" was selected for Q3, Q36 is skipped. Once question 36 is completed, the first phase of the supplier stratification survey is complete. The first phase of supplier stratification is completed before a contract with the supplier has been finalized, and thus provides the business with an objective picture of the amounts and types of risks posed by the supplier. The user will have more multiple choice questions to answer once a contract has been executed with the supplier. The post-contract questions are as follows.

The thirty seventh question (Q37) asks whether the business's supply chain management group negotiated the contract. Q37 addresses the risk element of supply chain management. The answer options for Q37 are "yes" with a question value of 1, "no but exception granted by supply chain management" with a question value of 1, and "no" with a question value of 5. The risk element weighted value is 3 for supply chain management.

The thirty eighth question (Q38) asks for identification of the anticipated life of the contract. Q38 addresses the risk elements of finance and supply chain management. The answer options for Q38 are "less than three years" with a question value of 1, "three years or greater but with standard termination for convenience language in the contract" with a question value of 3, and "three years or greater but with no standard termination for convenience language in the contract" with a question value of 5. The risk element weighted values are 3 for finance and 1 for supply chain management.

The thirty ninth question (Q39) asks for a description of the payment model from the business to the supplier. Q39 addresses the risk elements of finance and supply chain management. The answer options for Q39 are "electronic invoicing with payment upon completion or delivery of all requirements" with a question value of 1, "manual invoicing with payment upon completion or delivery of all requirements" with a question value of 3, "progress payments" with a question value of 3, "P-card" (a prepaid payment card) with a question value of 1, and "pre-payment of products and/or services" with a question value of 5. The risk element weighted values are 5 for finance and 1 for supply chain management.

The fortieth question (Q40) asks if there are service level agreements or delivery milestones in the contract. Q40 addresses the risk elements of finance and supply chain management. The answer options for Q40 are "yes" with a question value of 1 and "no" with a question value of 5. The risk element weighted values are 1 for finance and 1 for supply chain management.

The forty first question (Q41) asks if the contract contains the business's standard terms and conditions. Q41 addresses the risk element of supply chain management. The answer options for Q41 are "yes" with a question value of 1, "no but has completed the managed term process" with a question value of 2, and "no" with a question value of 5. The risk element weighted value is 5 for supply chain management.

Q41 has a subpart, Q41b, which is to be answered if the answer to Q41 is other than yes. Q41b requires that the user select a "yes", "no", or "non-applicable" answer to each of five questions addressing variations from the business's standard contract terms and conditions. The five questions under subpart Q41b may address issues such as, but not limited to, indemnity, liability, confidentiality, information security, and business continuity.

After all of the questions have been answered, the score totals are calculated. First, a sum of the risk element scores for all responses to individual questions is tallied for each risk element. In the present example, there are five risk element score totals calculated, one for each of the risk elements of business continuity, information security, finance, operational risk, and supply chain management. As noted above, the risk element score is the question value of an individual question multiplied by the risk element weighted value of the individual question. As noted previously, a single question may affect more than one risk element and may therefore have more than one risk element weighted value and more than one risk element score.

Next, an operational risk remediation component is calculated to adjust the sum of risk element scores for operational risk so that the risk element of operational risk is not unduly weighted in the final answer. This is the first of three places in the calculation of the final tier level for the supplier that there may be remediation, or adjustment, of the operational risk element score. The operational risk remediation component is used to account for the fact that a number of the survey questions encompass both operational risk and business continuity risk, or both operational risk and information security risk.

An operational risk remediation component with regard to business continuity is calculated by taking a sum of the weighted answers for questions that overlap between the risk elements of business continuity and operational risk, which are questions 3, 5, 7, and 8 in the example given herein. An operational risk remediation component with regard to information security is calculated by taking a sum of the weighted answers for questions that overlap between risk elements of information security and operational risk, which are questions 6, 10, 11, and 28 in the example described herein. Each of these sums is then subtracted from the sum of the risk element scores for all responses to individual questions for the risk element of operational risk. The end result of this remediation is that questions 3, 5, 7, and 8, and questions 6, 10, 11, and 28 will have no effect on the sum of risk element scores for operational risk unless the selected answer option has a question value greater than 1.

A non-remediated score is achieved for each risk element area. For the risk elements of business continuity, finance, operational risk, and supply chain management, the non-remediated score is achieved as follows. First, the number of questions answered and skipped for each risk element is calculated. The skipped questions comprise those questions that are not presented to the supplier stratification user due to the adaptive nature of the question interface. (Some questions will not be presented to the user based on answers given to previous questions.)

An average answer value per question is achieved by dividing the sum of the risk element scores for all responses to individual questions (calculated as noted in the previous paragraph) by the sum of all risk element weighted values for those questions. The scale of measurement is adjusted by subtracting 1 from the average answer value per questions to achieve a scale of 1-4. This is an adjustment from the scale of 0-5 used in the individual questions for both the question value and the risk element weighted value.

Next, the resulting number is multiplied by 25 to achieve a value on a 100-point scale (any non-integer values are rounded up to the nearest integer). These calculations are performed for each of the aforementioned risk element areas, and the resulting score is referred to as a scaled score, and is a value on a 100 point scale. There is a scaled score for each risk element. A higher scaled score value corresponds to a higher risk level.

For the risk element area of information security, the scaled score is calculated slightly differently. The questions that address information security are divided into two categories, "data elements" and "other information security". The questions assigned to the "data elements" category are assigned 60% of the weighting for all information security questions, and the questions assigned to the "other information security" category are assigned 40% of the weighting for all information security questions.

Information security data element questions are those that address whether the supplier will have access to specific customer, employee, or business data. Examples of these data include customer name, address, phone number, social security number, or account number. Other examples include employee name, address, phone number, social security number, employer benefits or marriage status. In the present exemplary embodiment, the data element questions include questions 20-24; other information security questions include questions 6, 10-19, 25, 27-29, and 41. After the 60/40 weighting of the two categories of information security questions, the sum of the resulting weighted scores is used, in place of the average answer value per question used for the other four risk elements, to complete the scaled score calculation.

Once a scaled score has been calculated for all risk elements, a score inversion is implemented. The scaled score is subtracted from 100, resulting in an inverted scale so that a lower number indicates more risk and a higher number indicates less risk. The resulting inverted score is then weighted according to risk element area. In the present embodiment, the weighting of the inverted score is 30% for business continuity, 30% for information security, 12% for finance, 16% for operational risk, and 12% for supply chain management. An overall non-remediated risk score is achieved for each risk element area by multiplying the inverted score by the weighted value listed in this paragraph. These overall non-remediated risk scores fall within a range of 0-100, with 0 representing the highest risk and 100 representing lowest risk. A sum of the non-remediated risk scores for the five risk element areas is calculated and is referred to as the inherent risk index (IRI).

If no further remediation is needed, the first operational risk remediation components for business continuity and information security, calculated as described above and included in calculation of IRI, are used in all further calculations. If further remediation is needed due to answer selections indicating a risk level higher than lowest risk, a second remediation may be pursued.

The supplier tier level is assigned after the IRI is calculated. The IRI and the dollar amount expected to be spent with the supplier (otherwise known as the "spend level") are both considered when assignment of supplier tier level occurs. The IRI and the spend level, whichever is indicative of highest risk, is used to assign the supplier tier level. The assignment of tier level to the supplier drives the management and oversight procedures that the financial institution utilizes with the supplier. A tier level assignment of one, for example, indicates that at least one of IRI and spend level poses high risk to the financial institution. The tier one supplier is thus subjected to rigorous oversight procedures in an effort to manage and mitigate the risks posed.

For the risk elements of information security and business continuity, a further assessment is required for risk levels higher than the lowest risk. Such assessment takes place outside of the supplier stratification tool and is highly specialized to the business enterprise undertaking the supplier stratification. Those of skill in the art understand that such assessment will be left to the discretion of those making decisions for the business enterprise, and there is no need to know exactly what comprises the assessment for the purpose of the present invention. However, the final score that is calculated from the further assessment must be on the same scale as the other risk scores in the IRI, which in this case is 0-100.

The scores resulting from the assessment are then fed back into the supplier stratification tool in place of the information security and business continuity scores used to achieve the IRI. This adjusted score is called the remediated risk index (RRI). Note that if the further assessment of information security or business continuity is not required, the RRI is equivalent to the IRI.

For business continuity, the second remediation calculation is as follows. The scores resulting from the assessment on a scale of 0-100 replace the business continuity risk element inverted score. The resulting score is then weighted according to business continuity risk element area. In the present embodiment, the weighting of the inverted score is 30% for business continuity. For information security, the second remediation calculation is as follows. The scores resulting from the assessment on a scale of 0-100 replace the information security risk element inverted score. The resulting score is then weighted according to information security risk element area. In the present embodiment, the weighting of the inverted score is 30% for information security.

An operational risk remediation average answer per question is calculated by dividing the sum of the operational risk remediation component for business continuity plus the operational risk remediation component for information security (both calculated as described in the previous paragraph(s?) by the sum of the risk element weighted values for all of the individual questions affected by operational risk. The second operational risk remediated score is then calculated by replacing the operational risk element score with the assessment score for the questions that overlap the business continuity and information security risk elements as explained in paragraph.

After the second operational risk remediation is completed, totals are again calculated as described above for the IRI, to achieve a sum of the risk scores. These values are the RRI totals. If no remediation is necessary, the values of these sums are the same as for the IRI totals.

An overall remediated score is calculated for each risk element by multiplying the remediated scaled score by the weighted value assigned to each risk element area. As noted above, in the present embodiment, the weighting of the risk elements is 30% for business continuity, 30% for information security, 12% for finance, 16% for operational risk, and 12% for supply chain management. The sum of the overall remediated scores for the five risk elements gives the RRI value.

Optionally, a third operational risk remediation may take place which provides a score representative of the optimal RRI value. This value is calculated the same way as the IRI and RRI above, with each risk element score set to its maximum realistic optimal level. This is not always be a perfect score, as the intent is to remediate the supplier's potential risk so that the best answer possible for that supplier can be selected for each question.

In some embodiments, the final report provided by supplier stratification may include an indication of level of risk for the risk elements of business continuity, information security, an engagement risk level (ERL), and finally, a proposed tier level assignment. The reported levels of risk for business continuity and information security are each assigned based on the scaled score on the 100 point scale, after inversion, so that a higher score indicates lower risk. The level of business continuity or information security risk reported is "low" if the scaled score on the 100 point scale after inverting is greater than 85, "medium" if the scaled score on the 100 point scale after inverting is less than or equal to 85 and greater than 70, "high" if the scaled score on the 100 point scale after inverting is less than or equal to 70 and greater than 55, and "significantly high" if the scaled score on the 100 point scale after inverting is less than or equal to 55.

The reported level of risk for the ERL is calculated by determining the minimal IRI score as selected from the scaled scores on the 100 point scale, after inverting, of business continuity, information security, and operational risk, and using the minimal IRI score in determining the ERL. In some embodiments, the level of engagement risk is reported as "low" if the minimal IRI score is greater than 100, "medium" if the minimal IRI score is less than or equal to 99 and greater than 70, "high" if the minimal IRI score is less than or equal to 70. If the ERL is low after the primary series of questions is answered in the supplier stratification series of questions (questions 1-16 in the present embodiment), there is no need to answer the secondary series of questions, as the supplier doesn't pose an unacceptable risk to the enterprise.

The proposed tier level assignment functions as follows. The tier level is assigned based on the average of the scaled scores from the risk elements of business continuity, information security, finance, and operational risk scores or annual spend level. The assignment is tier 4 if the overall score is greater than 85; tier 3 if the overall score is less than or equal to 85 and greater than 70; tier 2 if the overall score is less than or equal to 70 and greater than 55; and tier 1 if the overall score is less than or equal to 55.

A tier level can also be assigned simply by taking into account the annual level of spending the business is expected to engage in with the supplier. In this case, the tier level is assigned based on the answer selection chosen in response to question 1. The highest spend level corresponds to the highest risk, which is represented by tier 1. As noted above, Q1 has four answer options, with a weighted assigned question value for each option as follows. The first answer option "greater than or equal to $150 million" is assigned a question value of 5 and would therefore be assigned to tier level 1. The second answer option "greater than or equal to $35 million and less than $150 million" is assigned a question value of 4 and would therefore be assigned to tier level 2. The third answer option "greater than or equal to $5.5 million and less than $35 million" is assigned a question value of 2 and would therefore be assigned to tier level 3. The fourth answer option "less than $5.5 million" is assigned a question value of 1 and would therefore be assigned to tier level 4.

Note that no matter what the expected spend level with a specific supplier is, the supplier stratification survey described herein is useful for identifying supplier characteristics that provide a high level of potential risk to the enterprise. In one embodiment, the final proposed tier level assignment is based on the highest risk category present between the spend level and the survey results. As in other parts of supplier stratification, the final proposed tier level assigned relies on the most conservative estimate of the risk levels present.

It is understood that the examples of inputs, outputs, and user screen shots provided herein are intended as examples of how the supplier stratification survey may be presented during use and are not meant to be limiting. One of skill in the art would understand that many different presentations of the supplier stratification survey feature are possible. For example, one of skill in the art would recognize that in some embodiments, the supplier stratification survey output may be graphed or presented in a table or spreadsheet format for comparison between suppliers.

Figure 3:
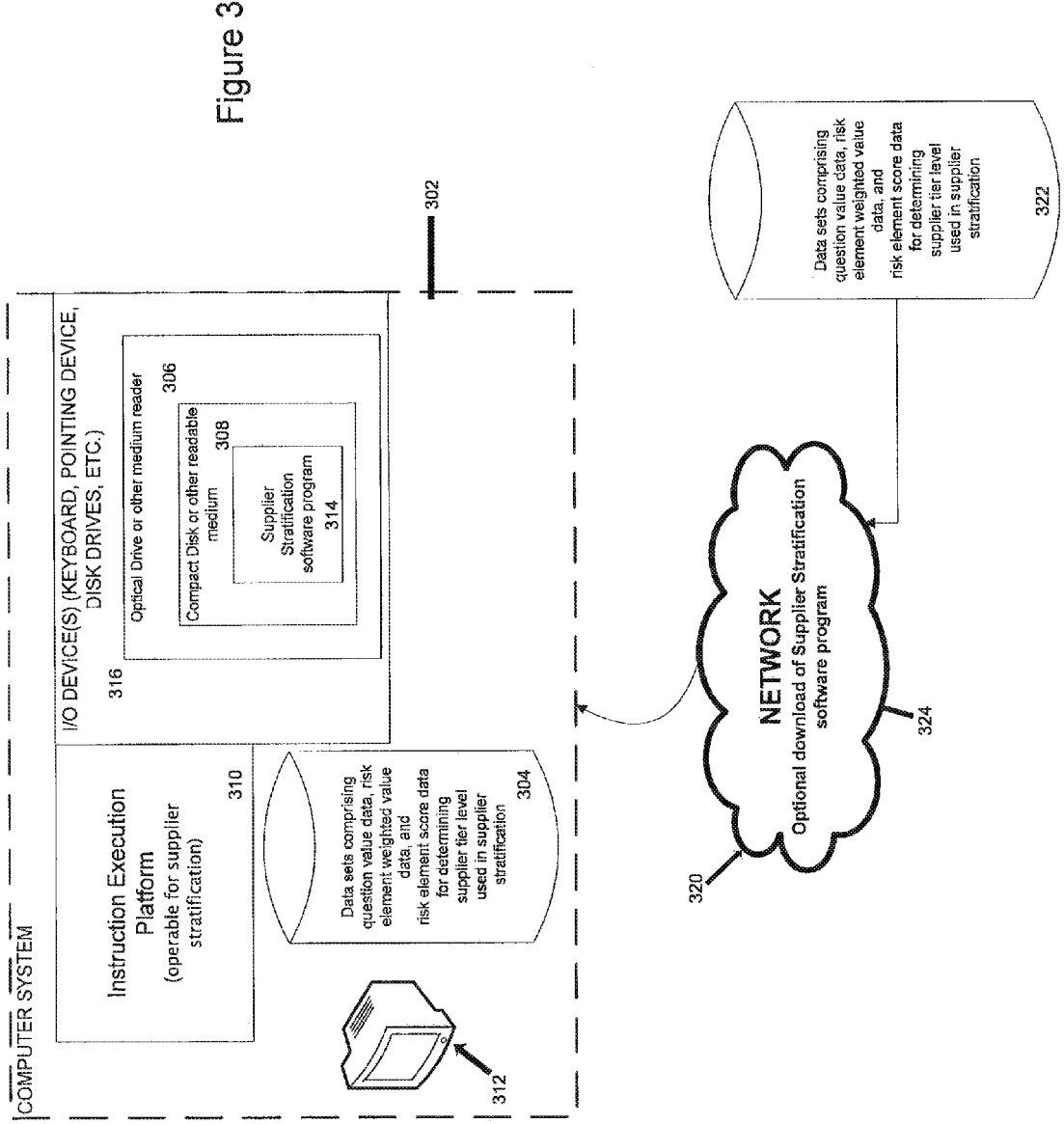
FIG. 3 is a system block diagram according to example embodiments of the invention.

FIG. 3 is a system block diagram according to example embodiments of the invention. FIG. 3 actually illustrates two alternative embodiments of a system implementing the invention. System 302 can be a workstation or personal computer. System 302 can be operated in a "stand-alone" mode. The system includes a fixed storage medium, illustrated graphically at 304, for storing programs and/or macros which enable the use of an embodiment of the invention. In a stand-alone implementation of the invention, fixed storage 304 can also include the data sets which are necessary to implement an embodiment of the invention. In this particular example, the input/output devices 316 include an optical drive 306 connected to the computing platform for loading the appropriate computer program product into system 302 from an optical disk 308. The computer program product includes a computer program or programs with instructions or code for carrying out embodiments of the methods of the invention. Instruction execution platform 310 of FIG. 3 includes a microprocessor and supporting circuitry and can execute the appropriate instructions and display appropriate screens on display device 212.

FIG. 3 also illustrates another embodiment of the invention in which case the system 320 which is implementing the invention includes a connection to data stores, from which data comprising risk factors, menu selections for risk factors, weighted risk values, and supplier risk scores can be retrieved, as shown at 322. The connection to the data stores or appropriate databases can be formed in part by network 324, which can be an intranet, virtual private network (VPN) connection, local area network (LAN) connection, or any other type of network resources, including the Internet. Data sets can be local, for example on fixed storage 304, or stored on the network, for example in data store 322.

A computer program which implements all or parts of the invention through the use of systems like those illustrated in FIG. 3 can take the form of a computer program product residing on a computer usable or computer readable storage medium. Such a computer program can be an entire application to perform all of the tasks necessary to carry out the invention, or it can be a macro or plug-in which works with an existing general purpose application such as a spreadsheet or database program. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or flash memory), a compact disc read-only memory (CD-ROM), or other optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Specific embodiments of an invention are described herein. One of ordinary skill in the computing and/or risk assessment arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

The invention claimed is:

1. A method of stratifying a supplier of goods or services, comprising:
    identifying a supplier of goods or services to a business;
    receiving, by a processor, selected answer options corresponding to a series of questions for measuring risk posed to the business by the supplier of goods or services to the business;
    achieving, by the processor, at least one risk element score for one or more questions of the series of questions by measuring at least one risk element for the one or more questions in the series of questions;
    calculating, by the processor, an inherent risk index (IRI) for the at least one risk element based on the at least one risk element score measured for the one or more questions of the series of questions;
    calculating, by the processor, a remediated risk index (RRI) when the IRI fails to meet a risk level wherein the RRI is a measure based in part on processes or safeguards put in place by the supplier to reduce risk;
    setting the RRI equal to the IRI when the IRI meets the risk level; and
    determining for the supplier at least one of a tier level or a composite supplier risk index (CSRI) based on the RRI for the at least one risk element.

2. The method of claim 1, wherein the series of questions comprises a primary series of questions and a secondary series of questions.

3. The method of claim 1 comprising five risk elements.

4. The method of claim 1, wherein the at least one risk element is selected from the group consisting of information security risk, business continuity risk, finance risk, operational risk, and supply chain risk.

5. The method of claim 2, wherein the answers selected for the primary series of questions are used to achieve an engagement risk level (ERL), and wherein the ERL is indicative of low risk the IRI, the RRI and the CSRI are not calculated.

6. The method of claim 4, wherein when the IRI calculated is indicative of a need for further risk assessment for the information security risk element or the business continuity risk element the RRI is calculated for the information security risk element or the business continuity risk element.

7. The method of claim 1, wherein the answer options for the questions are each assigned a weighted question value, which is used in calculating the risk element score for the supplier.

8. The method of claim 1, wherein measuring at least one risk element comprises assigning a risk element weighted value to each risk element measured by each question in the series of questions.

9. The method of claim 1, wherein the at least one risk element score is achieved by multiplying a weighted question value assigned to the selected answer option by a risk element weighted value assigned to the risk element measured.

10. The method of claim 1, wherein the tier level assignment further comprises a measure of the business's level of spending with the supplier.

11. The method of claim 1, wherein there are four possible tier levels.

12. The method of claim 1, wherein the series of questions is adaptively presented.

13. The method of claim 2, wherein the primary series of questions comprises up to sixteen questions.

14. The method of claim 2, wherein the primary series of questions and the secondary series of questions comprise up to forty one questions.

15. A computer program product, the computer program product comprising a non-transitory medium with a computer readable program code embodied therein, the computer readable program code for execution by an instruction execution platform to implement a method of stratifying a supplier of goods or services, the method comprising:
   identifying a supplier of goods or services to a business;
   receiving selected answer options corresponding to a series of questions for measuring risk posed to the business by the supplier of goods or services to the business;
   achieving at least one risk element score for one or more questions of the series of questions by measuring at least one risk element for the one or more questions in the series of questions;
   calculating an inherent risk index (IRI) for the at least one risk element based on the at least one risk element score measured for the one or more questions of the series of questions
   calculating a remediated risk index (RM) when the IRI fails to meet a risk level, wherein the RRI is a measure based in part on processes or safeguards put in place by the suppler to reduce risk;
   setting the RRI equal to the IRI when the IRI meets the risk level; and
   determining for the supplier at least one of a tier level or a composite supplier risk index (CSRI) based on the RRI for the at least one risk element.

16. The computer program product of claim 15, wherein the series of questions comprises a primary series of questions and a secondary series of questions.

17. The computer program product of claim 15 comprising five risk elements.

18. The computer program product of claim 15, wherein the at least one risk element is selected from the group consisting of information security risk, business continuity risk, finance risk, operational risk, and supply chain risk.

19. The computer program product of claim 16, wherein the answers selected for the primary series of questions are used to achieve an engagement risk level (ERL), and wherein the ERL is indicative of low risk the IRI, the RRL and the CSRI are not calculated.

20. The computer program product of claim 18, wherein when the IRI calculated is indicative of a need for further risk assessment for the information security risk element or the business continuity risk element the RRI is calculated for the information security risk element or the business continuity risk element.

21. The computer program product of claim 15, wherein the answer options for the questions are each assigned a weighted question value, which is used in calculating the risk element score for the supplier.

22. The computer program product of claim 15, wherein measuring at least one risk element comprises assigning a risk element weighted value to each risk element measured by each question in the series of questions.

23. The computer program product of claim 15, wherein the at least one risk element score is achieved by multiplying a weighted question value assigned to the selected answer option by a risk element weighted value assigned to the risk element measured.

24. The computer program product of claim 15, wherein the tier level assignment further comprises a measure of the business's level of spending with the supplier.

25. The computer program product of claim 15, wherein there are four possible tier levels.

26. The computer program product of claim 15, wherein the series of questions is adaptively presented.

27. The computer program product of claim 16, wherein the primary series of questions comprises up to sixteen questions.

28. The computer program product of claim 16, wherein the primary series of questions and the secondary series of questions comprise up to forty one questions.

29. A system for stratifying a supplier of goods or services comprising:
   a memory device comprising computer-readable program code; and
   a processor operatively coupled to the memory device, wherein the processor is configured to execute the computer-readable program code to:
   present a series of questions for measuring risk posed to the business by the supplier of goods or services to the business;
   achieve at least one risk element score for one or more questions of the series of questions by measuring at least one risk element for the one or more questions in the series of questions;
   calculate an inherent risk index (IRI) for the at least one risk element based on the at least one risk element score measured for the one or more questions of the series of questions
   calculating a remediated risk index (RRI) when the IRI fails to meet a risk level, wherein the RRI is a measure based in part on processes or safeguards put in place by the suppler to reduce risk;
   setting the RRI equal to the IRI when the IRI meets the risk level; and
   determine at least one of a tier level or a composite supplier risk index (CSRI based on the RRI for the at least one risk element.

30. An apparatus for stratifying a supplier of goods or services, comprising:
   a memory device comprising computer-readable program code; and
   a processor operatively coupled to the memory device, wherein the processor is configured to execute the computer-readable program code to:
   identify a supplier of goods or services to a business;

receive selected answer options corresponding to a series of questions for measuring risk posed to the business by the supplier of goods or services to the business;

achieve at least one risk element score for one or more questions of the series of questions by measuring at least one risk element for the one or more questions in the series of questions;

calculate an inherent risk index (IRI) for the at least one risk element based on the at least one risk element score measured for the one or more questions of the series of questions;

calculating a remediated risk index (RRI) when the IRI fails to meet a risk level, wherein the RRI is a measure based in part on processes or safeguards put in place by the suppler to reduce risk;

setting the RRI equal to the IRI when the IRI meets the risk level; and deterime for the supplier at least one of a tier level or a composite supplier risk index (CSRI) based on the RRI for the at least one risk element.

* * * * *

UNITED STATES PATENT AND TRADEMARK OFFICE
CERTIFICATE OF CORRECTION

PATENT NO. : 8,185,430 B2
APPLICATION NO. : 12/363145
DATED : May 22, 2012
INVENTOR(S) : Mary Frances Edwards et al.

Page 1 of 1

It is certified that error appears in the above-identified patent and that said Letters Patent is hereby corrected as shown below:

Claim 15, Column 23, Line 43, delete "(RM)" and replace with --(RRI)--.

Signed and Sealed this
Seventeenth Day of July, 2012

David J. Kappos
*Director of the United States Patent and Trademark Office*